United States Patent
D'Souza

(10) Patent No.: US 8,645,681 B1
(45) Date of Patent: Feb. 4, 2014

(54) TECHNIQUES FOR DISTRIBUTING SECURE COMMUNICATION SECRETS

(75) Inventor: Aldrin J. D'Souza, Madhya Pradesh (IN)

(73) Assignee: EMC Corporation, Hopkinton, MA (US)

( * ) Notice: Subject to any disclaimer, the term of this patent is extended or adjusted under 35 U.S.C. 154(b) by 133 days.

(21) Appl. No.: 13/247,034

(22) Filed: Sep. 28, 2011

(51) Int. Cl.
*H04L 29/06* (2006.01)

(52) U.S. Cl.
USPC .......................... 713/153; 380/259; 380/278

(58) Field of Classification Search
USPC .................................. 380/259, 278; 713/153
See application file for complete search history.

(56) References Cited

U.S. PATENT DOCUMENTS

| 6,154,543 | A * | 11/2000 | Baltzley | 380/255 |
|---|---|---|---|---|
| 6,694,025 | B1 * | 2/2004 | Epstein et al. | 380/279 |
| 7,502,467 | B2 | 3/2009 | Brainard et al. | |
| 2002/0004898 | A1 * | 1/2002 | Droge | 713/151 |
| 2002/0078351 | A1 * | 6/2002 | Garib | 713/168 |
| 2004/0268127 | A1 * | 12/2004 | Sahota | 713/175 |
| 2005/0044406 | A1 * | 2/2005 | Stute | 713/201 |
| 2006/0064463 | A1 * | 3/2006 | Chan et al. | 709/206 |
| 2007/0195957 | A1 * | 8/2007 | Arulambalam et al. | 380/277 |
| 2009/0287922 | A1 * | 11/2009 | Herwono et al. | 713/155 |

OTHER PUBLICATIONS

Philpott, et al., "Multi-Channel Transaction Signing," U.S. Appl. No. 12/820,829, filed Jun. 22, 2010.

* cited by examiner

*Primary Examiner* — Hadi Armouche
*Assistant Examiner* — Christopher C Harris
(74) *Attorney, Agent, or Firm* — BainwoodHuang

(57) ABSTRACT

Techniques are described for establishing a secure communication channel between a server computer and a client computer. A method includes (a) at the server computer, receiving a command from a user, the command including a secret passphrase, (b) at the server computer, generating a cryptographic key for use by the client computer, (c) at the server computer, storing the cryptographic key within a locked file in encrypted form, the locked file being protected by the passphrase, (d) at the server computer, sending the locked file to the client computer over a network connection, and (e) conducting secure communications between the server computer and the client computer over the network connection, using the cryptographic key for encrypting the secure communications. A corresponding method performed by the client computer is also described. Corresponding computer program products and apparatuses are also described.

17 Claims, 5 Drawing Sheets

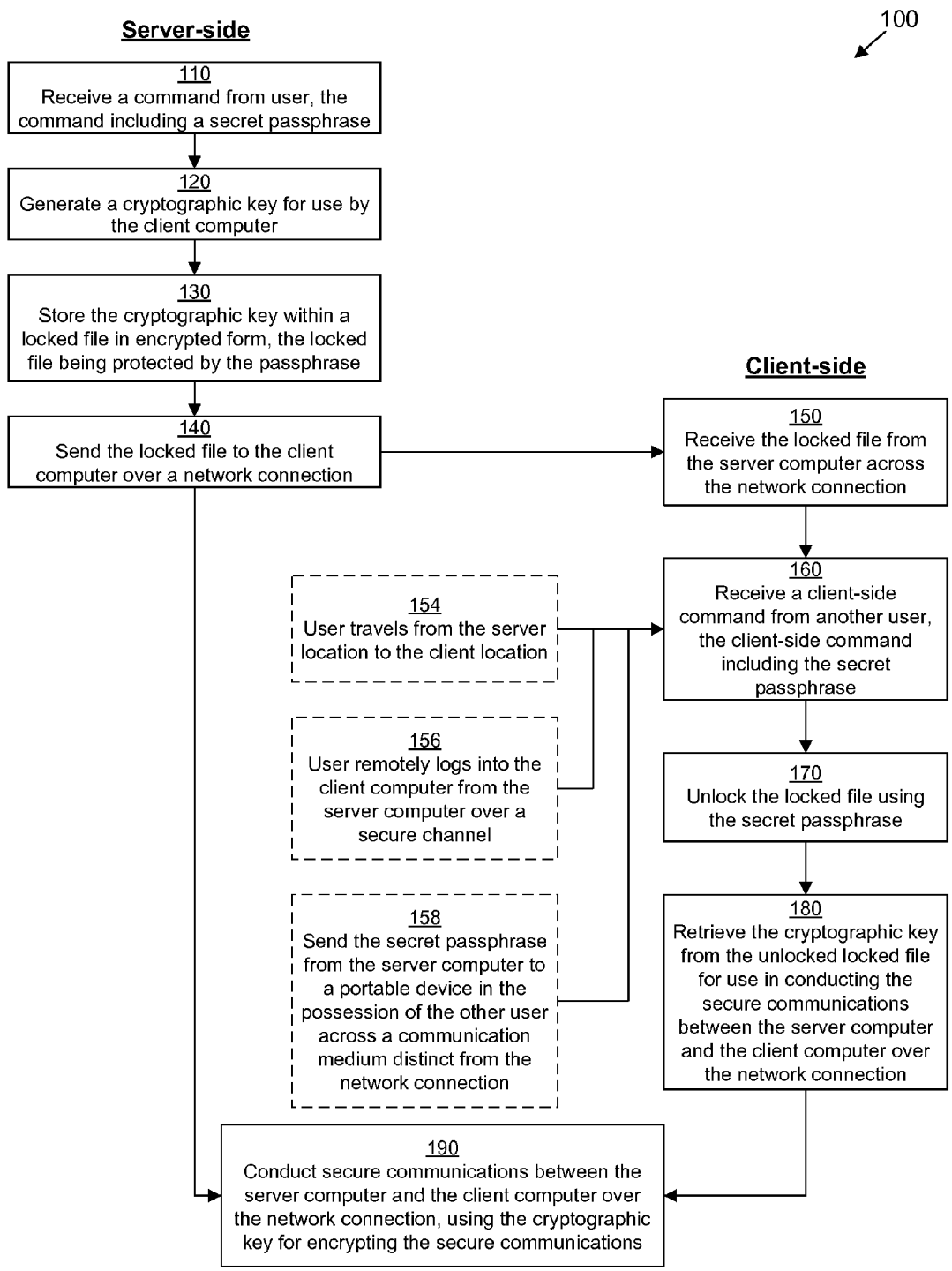

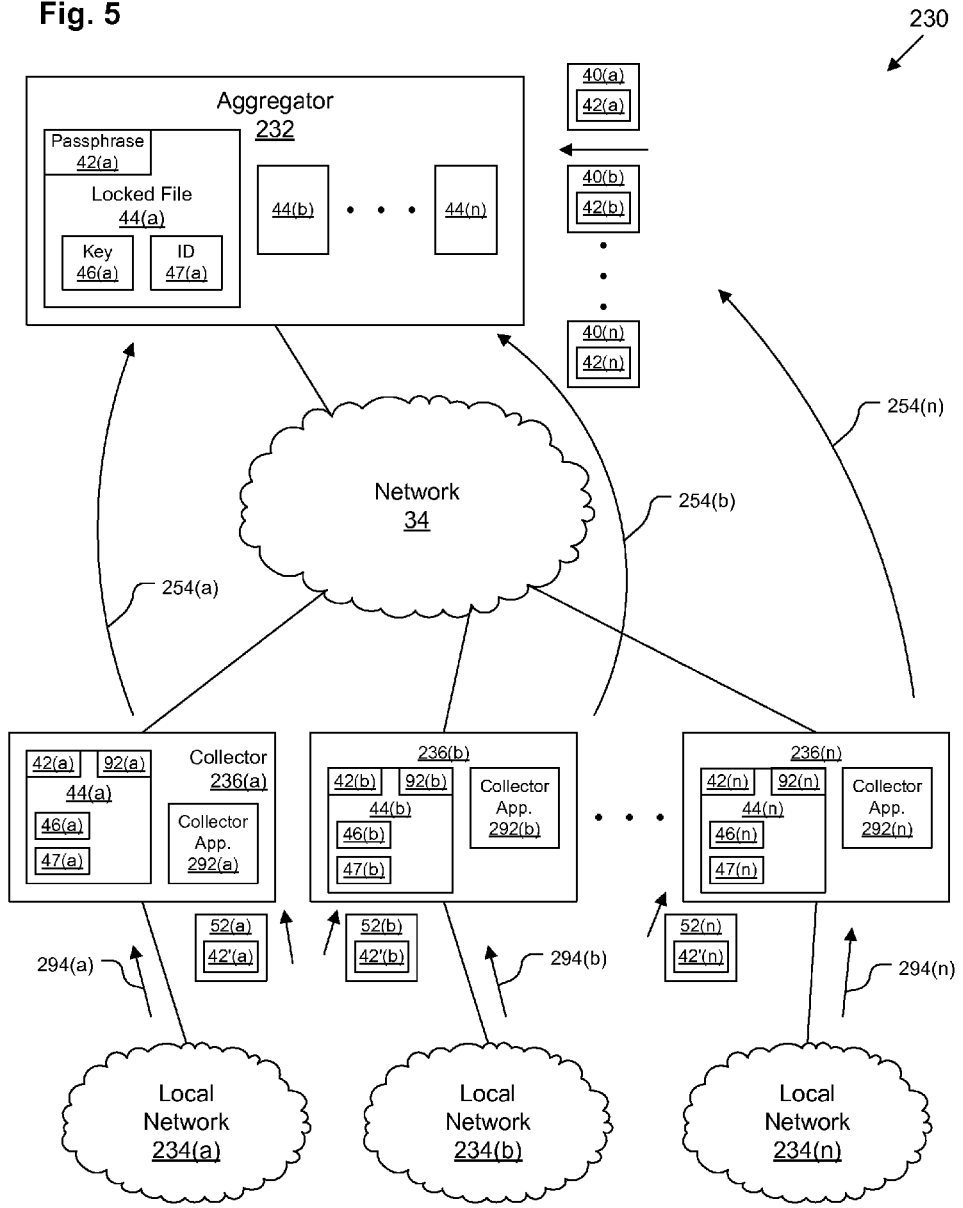

TECHNIQUES FOR DISTRIBUTING SECURE COMMUNICATION SECRETS

BACKGROUND

Often, system administrators desire to connect a central computer server to one or more remote client machines over secure connections. Typical secure connections between the central computer server and a remote client machine include systems in which the central computer server encrypts communications destined for the remote client machine using an encryption key, and the remote client machine decrypts the encrypted communications using the encryption key. Similarly, the remote client machine encrypts communications destined for the central computer server using an encryption key, and the central computer server decrypts the encrypted communications using the encryption key. In some systems, various keys are used for different purposes.

In order to set up the secure connection between the central computer server and a remote client machine, system administrators will typically run the central computer server to generate an encryption key to be used by the remote client machine, and then transfer the encryption key to the remote client machine by e-mail, by physical disk transfer, or across a pre-existing secure channel. For example, the system administrator may connect a diskette or a flash drive to the central computer server, transfer the generated encryption key from the central computer server to the diskette or flash drive, move the diskette or flash drive to the location of the remote client machine, connect the diskette or flash drive to the remote client machine, and finally transfer the generated encryption key from the diskette or flash drive to the remote client machine.

SUMMARY

Unfortunately, the above-described approaches to transferring a key from a central computer server to a client computer suffer from deficiencies. In particular, sending a key by e-mail is insecure, sending a key by disk is slow and inefficient, and a pre-existing secure channel may not be available, particularly when the point of the transfer is to set up a secure channel.

In contrast to the above-described approaches, embodiments are disclosed for securely distributing communication secrets within an encrypted file. Thus, security is preserved, while also being efficient.

In one embodiment, a method of establishing a secure communication channel between a server computer and a client computer is disclosed. The method includes, (a) at the server computer, receiving a command from a user, the command including a secret passphrase, (b) at the server computer, generating a cryptographic key for use by the client computer, (c) at the server computer, storing the cryptographic key within a locked file in encrypted form, the locked file being protected by the passphrase, (d) at the server computer, sending the locked file to the client computer over a network connection, and (e) conducting secure communications between the server computer and the client computer over the network connection, using the cryptographic key for encrypting the secure communications. In one embodiment, the method also includes (f) at the client computer, receiving the locked file from the server computer across the network connection, (g) at the client computer, receiving a client-side command from another user, the client-side command including the secret passphrase, (h) at the client computer, unlocking the locked file using the secret passphrase, and (i) at the client computer, retrieving the cryptographic key from the unlocked locked file for use by a secure communications application in conducting the secure communications between the server computer and the client computer over the network connection. Unlocking the locked file includes, at a locking application, decrypting contents of the locked file, re-encrypting the contents using a locking key securely stored within the locking application, storing the re-encrypted contents in the locked file, and granting privileges to the secure communications application to access the contents via the locking application. Corresponding computer program products and apparatuses are also disclosed.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 illustrates an example method of several embodiments.

FIG. 5 illustrates an example system of one embodiment.

DETAILED DESCRIPTION

Embodiments are herein disclosed for securely distributing communication secrets from a server to a client within an encrypted file. Thus, security is preserved, while also being efficient.

Figure 1:
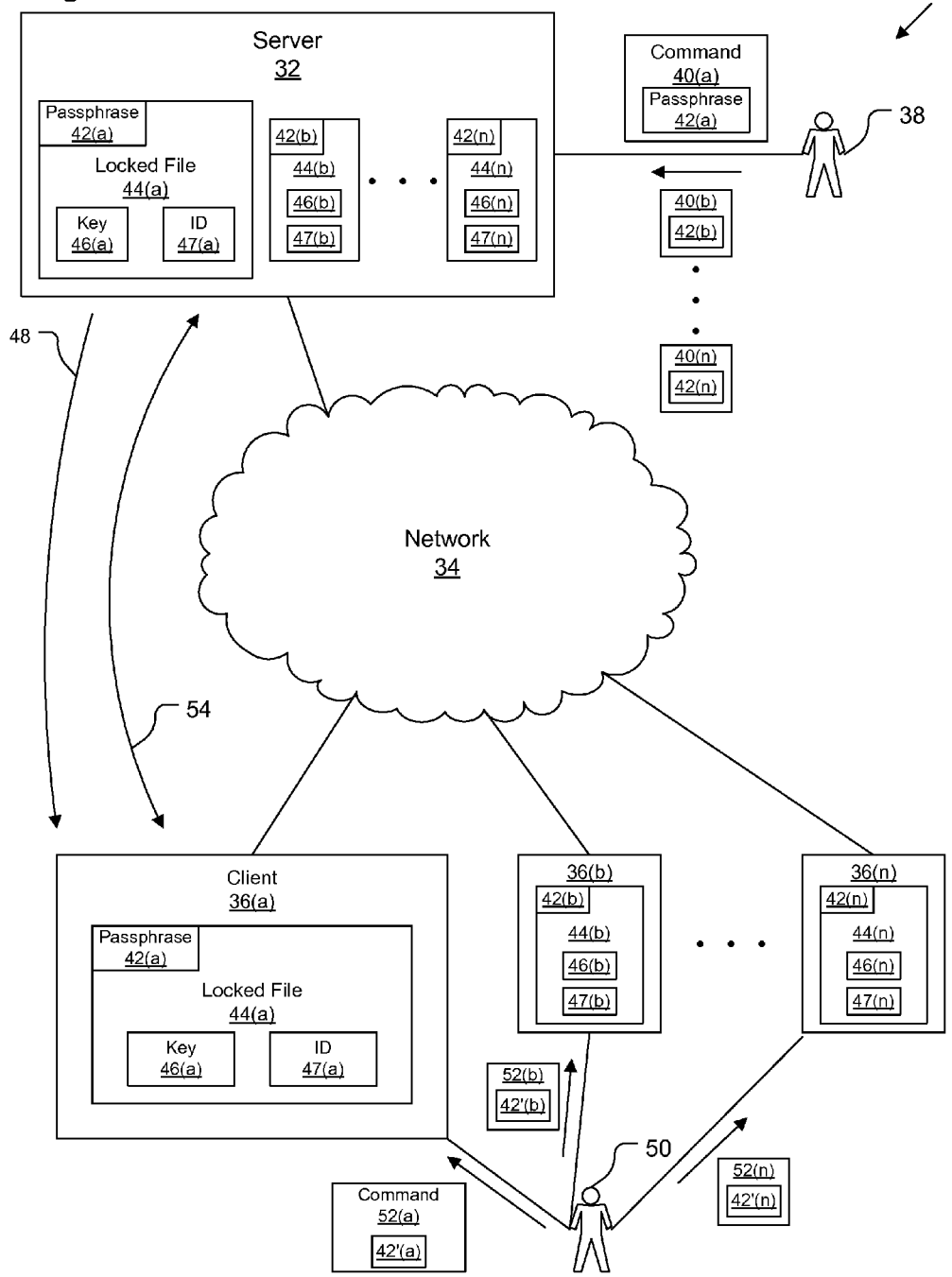
FIG. 1 illustrates an example system for use in accordance with several embodiments.

FIG. 1 depicts an example system 30 for use in practicing various embodiments. System 30 includes a server computer, which connects to a computer network 34. Network 34 may be a local area network, a wide area network, a virtual private network, an interconnected fabric of connections, etc. In some embodiments, network 34 may be the Internet. Network 34 also connects to a set of client computer devices 36, depicted as client computer devices 36(a), 36(b), . . . , 36(n). Client computer devices 36 may be any network-attachable computerized devices such as, for example, computers, desktop computers, laptop computers, computerized devices, workstations, servers, terminals, mobile devices, cellular telephones, smart phones, tablets, etc.

In operation, a user 38 may send a command 40 to server 32, the command 40 including a passphrase 42, the command directing the server 32 to set up a secure communication channel with a client 36 by generating a key 46 and storing the key in an encrypted locked file 44, protected by the passphrase. For example, user 38 may send command 40(a) including passphrase 42(a), directing the server 32 to set up a secure communication channel with client 36(a). Server 32 may be configured to generate an encryption key 46(a) to be used by client 36(a) in encrypting and decrypting communications with the server 32. Server 32 may further be configured to store the key 46(a) and an identification code 47(a) identifying the particular client 36(a) within an encrypted file 44(a), referred to as a "locked file," since access privileges to the file 44(a) are only granted to entities having the passphrase 42(*a*). Server 32 is then able to send a message 48 to client 36(*a*), transmitting the locked file 44(*a*) thereto. Another user 50 is then able to transmit another command 52(*a*) to the client 36(*a*), the command 52(*a*) including a passphrase 42'(a) (which, should be identical to the original passphrase 42(*a*)). Once client 36(*a*) is in possession of the passphrase 42'(a), it is able to use that passphrase (assuming it is correct) to unlock the locked file 44(*a*) and thereby gain access to the key 46(*a*) (and use the ID 47(*a*) to ensure that it is the correct client). Client 36(*a*) is then able to engage in secure communications 54 with server 32 across network 34, using key 46(*a*). A similar procedure may be used to set up secure communication between the server 32 and any of the clients 36(*a*), 36(*b*), . . . , 36(*n*).

Figure 2:
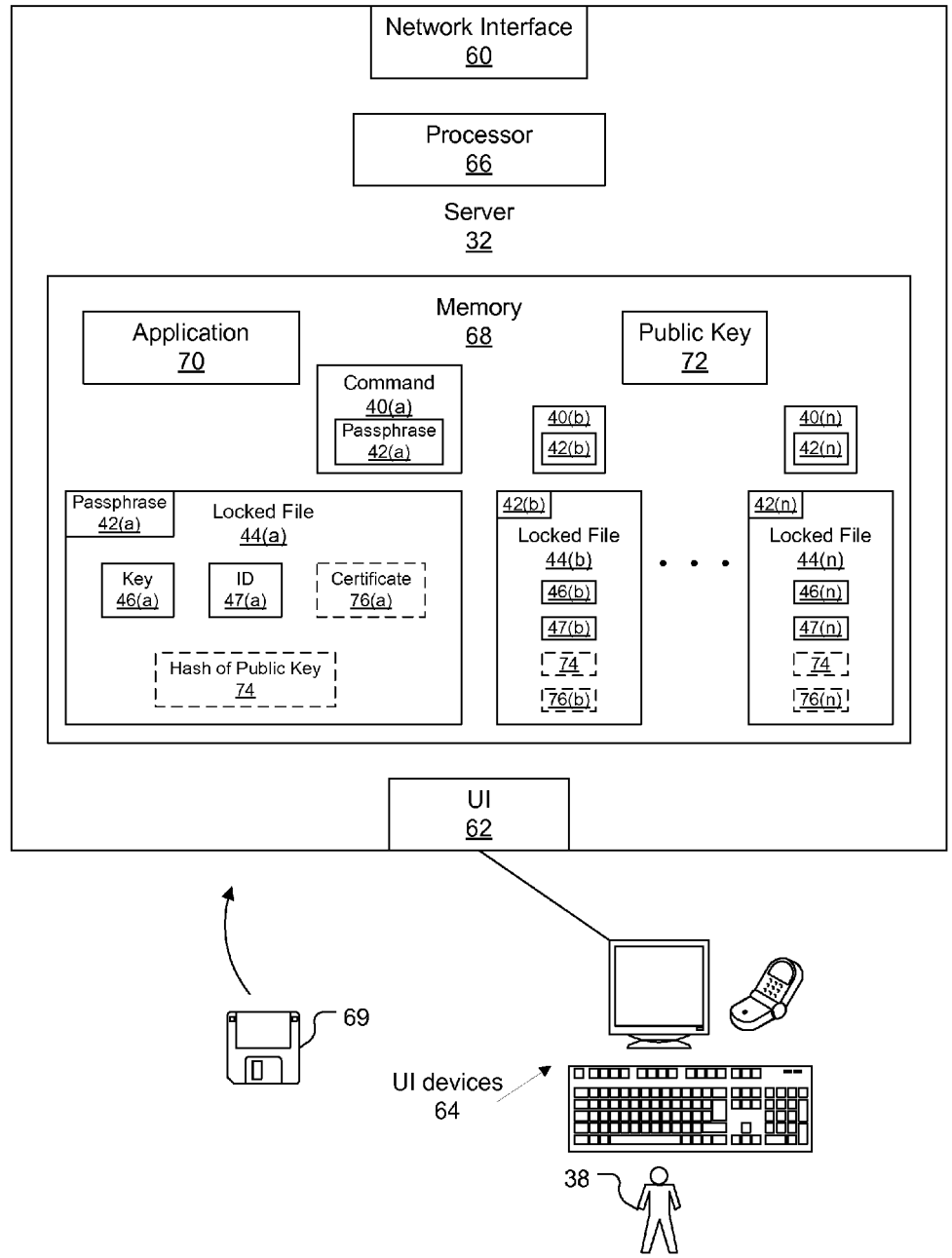
FIG. 2 illustrates an example apparatus of several embodiments.

FIG. 2 depicts an example server computer 32 in detail. Server 32 may include a network interface 60 for connecting to network 34, user interface (UI) circuitry 62 for connecting to UI devices 64 (e.g., a display monitor, a touch-sensitive display device, a keyboard, a keypad, a mouse, a tracking pad, a tracking ball, etc.) through which a user 38 can interact with the server 32, a processor 66, and memory 68.

Processor 66 may be, for example, a central processing unit, a microprocessor, a collection of microprocessors, a digital signal processor, a field-programmable gate array, a collection of circuits configured to perform various operations, or another similar device or set of devices configured to perform operations. Memory 68 may include, for example, system memory, cache memory, volatile memory, non-volatile memory, random access memory, read-only memory, non-volatile storage, magnetic storage, optical storage, some combination thereof, or another similar device or set of devices configured to store application programs and/or application data.

Memory 68 also stores an application 70, which includes a set of instructions to be executed by processor 66. Application 70 may have been installed on server 32 from a computer program product 69, which is a tangible non-transitory computer-readable storage medium storing instructions, which when executed by the processor 66, cause the processor 66 to execute application 70. It should be understood that storage of application 70 within memory 68 may render all or a portion of memory 68 as an example of computer program product 69. Computer program product 69 may also be embodied in a magnetic diskette or series of diskettes, an optical disc, a hard disk, a flash memory drive, etc.

Application 70, when executed by processor 66, is configured to cause the processor 66 to perform a method (see FIG. 4, below) according to one embodiment. In some embodiments, for example, when processor 66 is implemented as a collection of circuits configured to perform various operations, application 70 may be functionally implemented within the collection of circuits in addition to or in lieu of being stored within memory 68. In any event, within this document, whenever application 70, or any piece or portion of software within server 32, is described as performing a method or operation, that method or operation is actually performed by the processor 66 while executing instructions of application 70 or the piece or portion of software within server 32.

Memory 68 also stores a public key 72 to be used by external devices in conducting asymmetrically-encrypted communication with server 32 as well as in authentication. Upon receiving a command 40 (with included passphrase 42) from user 38 via UI devices 64 and UI circuitry 62, the command 40 is also stored within memory 68. Memory 68 may also store the locked files 44(*a-n*) for each of the clients 36(*a-n*) for which commands 40(*a-n*) have been received to establish secure communication with. Each locked file 44(*a-n*) may also store a hash 74 of the server's public key as well as a certificate 76(*a-n*) generated for that client 36(*a-n*). Further detail with respect to the contents of memory 68 will be provided below, in connection with FIG. 4. Memory 68 may also store additional items typically stored within memory, such as, for example, an operating system executed by processor 66, additional application programs, additional application data, and user data (not depicted).

Figure 3:
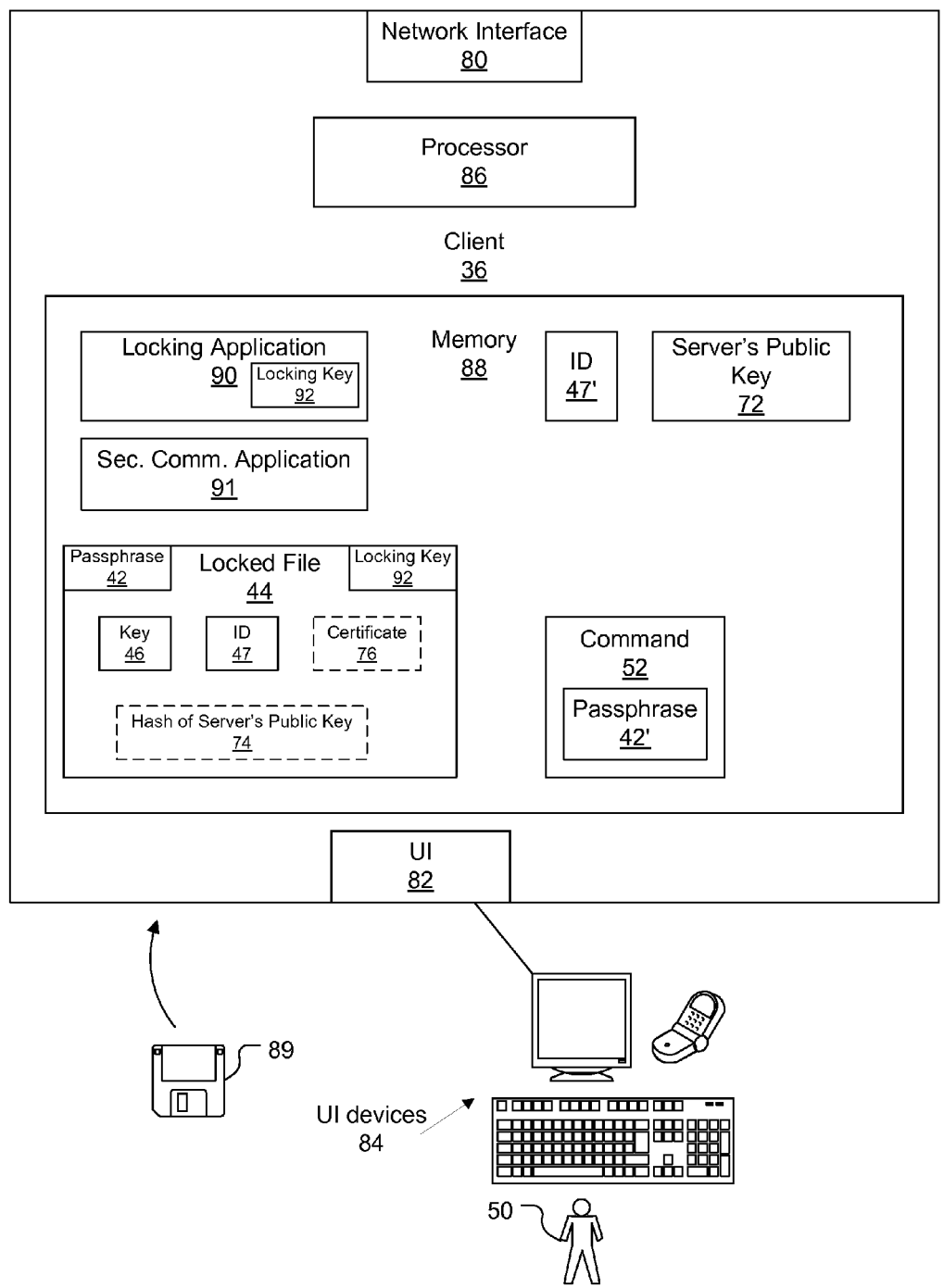
FIG. 3 illustrates an example apparatus of several embodiments.

FIG. 3 depicts an example client computer 36 in detail. Client 36 may include a network interface 80 for connecting to network 34, user interface (UI) circuitry 82 for connecting to UI devices 84 (e.g., a display monitor, a touch-sensitive display device, a keyboard, a keypad, a mouse, a tracking pad, a tracking ball, etc.) through which a user 50 can interact with the client 36, a processor 86, and memory 88.

Processor 86 may be, for example, a central processing unit, a microprocessor, a collection of microprocessors, a digital signal processor, a field-programmable gate array, a collection of circuits configured to perform various operations, or another similar device or set of devices configured to perform operations. Memory 88 may include, for example, system memory, cache memory, volatile memory, non-volatile memory, random access memory, read-only memory, non-volatile storage, magnetic storage, optical storage, some combination thereof, or another similar device or set of devices configured to store application programs and/or application data.

Memory 88 also stores a locking application 90, which includes a set of instructions to be executed by processor 86. Locking application 90 may have been installed on client 36 from a computer program product 89, which is a tangible non-transitory computer-readable storage medium storing instructions, which when executed by the processor 86, cause the processor 86 to execute locking application 90. It should be understood that storage of locking application 90 within memory 88 may render all or a portion of memory 88 as an example of computer program product 89. Computer program product 89 may also be embodied in a magnetic diskette or series of diskettes, an optical disc, a hard disk, a flash memory drive, etc. Memory 88 also stores a secure communications application 91, which includes a set of instructions to be executed by processor 86. Secure communications application 91 may have been installed on client 36 from another computer program product (similar to computer program product 89), which is a tangible non-transitory computer-readable storage medium storing instructions, which when executed by the processor 86, cause the processor 86 to execute secure communications application 91.

Locking application 90, when executed by processor 86, is configured to cause the processor 86 to perform a method (see FIG. 4, below) according to one embodiment. In some embodiments, for example, when processor 86 is implemented as a collection of circuits configured to perform various operations, locking application 90 may be functionally implemented within the collection of circuits in addition to or in lieu of being stored within memory 88. In any event, within this document, whenever locking application 90, or any piece or portion of software within client 36, is described as performing a method or operation, that method or operation is actually performed by the processor 86 while executing instructions of locking application 90 or the piece or portion of software within client 36.

Memory 88 also stores a local identification code 47', to identify which of clients 36(*a-n*) it is. Upon receiving a command 52 (with included passphrase 42') from user 50 via UI devices 84 and UI circuitry 82, the command 52 is also stored within memory 88. Memory 88 may also store the locked file 44 received from server 32 over message 48. Locked file 44 stores the same contents as described above in connection with server 32 in FIG. 2. Memory 88 may also store the server's public key 72, which client 36 may have received from server 32 or from a central public key database. Memory 88 may also store additional items typically stored within memory, such as, for example, an operating system executed by processor 86, additional application programs, additional application data, and user data (not depicted).

FIG. 4 depicts an example method 100, performed by server 32 and a client 36 according to several embodiments. Steps depicted on the left side of FIG. 4 illustrate steps performed by server 32, steps on the right side of FIG. 4 illustrate steps performed by a client 36(a-n), and steps within the middle of FIG. 4 illustrate steps performed either by both server 32 and client 36, that result from communication therebetween, or by neither.

It should be understood that method 100 may be performed with respect to any one of clients 36(a-n), and it may also be repeated multiple times, each time in connection with a different client 36(a-n). For the sake of simplicity, method 100 will be described with respect to a particular client 36(a).

In step 110, application 70 receives a command 40(a) from the user 38 via UI circuitry 62 and UI devices 64, to establish secure communication with client 36(a). Command 40(a) includes a secret passphrase 42(a). Secure passphrase 42(a) may be, for example, a strong 8-character (or more) password, as is well-known in the art. In step 120, application 70 generates a cryptographic key 46(a) to be used in connection with secure communications 54 with the client 36(a). In some embodiments, all of the secure communications 54 with the client 36(a), in both directions, may be symmetrically encrypted and decrypted using key 46(a). In other embodiments, key 46(a) may instead be a private key associated with client 36(a) for use in asymmetric encryption.

In step 130, application 70 encrypts key 46(a) and stores the key 46(a) within locked file 44(a) in encrypted format. In some embodiments, passphrase 42(a) is used as the encryption key with which key 46(a) is encrypted, while, in other embodiments, passphrase 42(a) is used to generate an encryption key with which key 46(a) is encrypted. In some embodiments, all contents of locked file 44(a) may be encrypted together using passphrase 42(a). Locked file 44(a) may be any kind of encrypted file, access to which is restricted to entities having the proper passphrase 42(a). In one embodiment, locked file 44(a) may be a Lockbox file generated according to the RSA Common Security Toolkit, distributed by the EMC Corp. of Hopkinton, Mass. Application 70 also stores the identification code 47(a) associated with client 36(a) within locked file 44(a) to ensure that the proper client 36(a) receives the proper locked file 44(a).

In some embodiments, additional pieces of data may also be stored within the locked file 44(a). In one embodiment, application 70 calculates a hash 74 (using, for example, the well-known MD5 algorithm) of the server's public key 72, and stores that hash 74, in encrypted form, within locked file 44(a). In one embodiment, application 70 generates an authentication certificate 76(a) associated with the secure communications 54 between server 32 and client 36(a), and stores that certificate within locked file 44(a). In one embodiment (not depicted), application 70 generates a password for client 36(a) to use in addition to encryption key 46(a) to engage in the secure communications 54.

Once locked file 44(a) is completely generated, step 140 may be performed to send the locked file 44(a) to the client 36(a). In some embodiments, application 70 sends locked file 44(a) to client 36(a) within message 48 sent over the network 32 via network interface 60 of server 32. In other embodiments, locked file 44(a) may be sent to client 36(a) by any other means of communication, such as, for example, by physical disk transfer, e-mail, mobile device, etc.

In some embodiments, after sending the locked file 44(a) to the client 36(a), application 70 may be configured to delete the local copy of locked file 44(a), retaining an unencrypted copy of key 46(a) (and the other secrets stored within the locked file 44(a)) and associates it with identification code 47(a) associated with client 36(a), for example, using a table. Thus, application 70 is able to remotely de-commission any client 36 by deleting the table entry associating a key 46(i) with a respective client 36(i). In some embodiments, after sending the locked file 44(a) to the client 36(a), application 70 may also be configured to delete the local copy of passphrase 42(a).

In step 150, client 36(a) receives the locked file 44(a). In one embodiment locking application 90 receives locked file 44(a) via network interface 80 of client 36(a).

In step 160, locking application 90 receives a command 52(a) from second user 50. Command 52(a) includes secret passphrase 42'(a), which, if user 50 is properly-informed, should be identical to secret passphrase 42(a). Since secret passphrase 42(a) is a secret, there are several ways that second user 50 may be made aware of it. Typically, step 160 is preceded by one of steps 154, 156, or 158.

In steps 154 and 156, user 50 is the same person as user 38. In step 154, user 38 travels from the location of the server 32 to the location of the client 36(a) (the server 32 being somewhat remote from the client 36(a), such as, for example, in different rooms within a building, in different buildings within a campus, or in different parts of a metropolitan area), and then user 38 enters command 52(a) into UI devices 84 so that locking application 90 can, in step 160, receive the command 52(a) via UI circuitry 82.

In step 156, user 38 remotely logs into client 36(a) over a secure channel, such as, for example, using the well-known SSH protocol, and remotely transmits the message 52(a) to client 36(a) so that locking application 90 can, in step 160, receive the command 52(a) via network interface 80. In embodiments in which step 156 is performed, typically, the server 32 is quite remote from the client 36(a), such as, for example, in different cities or countries, although, in some embodiments, the server 32 may be only somewhat remote from the client 36(a).

In step 158, user 50 is a different person than user 38. In step 158, user 38 sends command 52(a) (or, in some embodiments, just secret passphrase 42(a)) to user 50 at client 36(a), such as by sending a message to a portable device in possession of user 50 across a communication medium distinct from network 34. For example, user 38 may send the message to user 50 by sending an SMS text message to the cell phone of user 50. As an additional example, user 38 may call user 50 on the telephone and recite the secret passphrase 42(a) to user 50 orally. Once user 50 receives the secret passphrase 42 or the command 52(a), user 50 may enter command 52(a) into UI devices 84 so that locking application 90 can, in step 160, receive the command 52(a) via UI circuitry 82. In embodiments in which step 158 is performed, typically, the server 32 is quite remote from the client 36(a), such as, for example, in different cities or countries, although, in some embodiments, the server 32 may be only somewhat remote from the client 36(a).

In step 170, locking application 90 unlocks the locked file 44(a) using the passphrase 42'(a) received within command 52(a). It should be noted, that step 170 will only be successful if passphrase 42'(a) is the same as passphrase 42(a). Unlocking locked file 44(a) may include granting secure communications application 91, running on the client 36(a), privileges to access contents of the locked file 44(a), typically to the exclusion of all other applications. This may be done by application 90 only providing passphrase 42'(a) to the secure communication application 91.

In some embodiments, locking application 90 unlocks the locked file 44(a) by decrypting the contents of locked file 44(a) using the passphrase 42'(a), re-encrypting the decrypted contents using a locking key 92(a), storing the re-encrypted contents within the locked file 44(a), and granting privileges to the secure communications application 91 to access the contents via the locking application 90 to the exclusion of all other applications. In one embodiment, locked file 44(a) then stores both the originally encrypted contents (encrypted using passphrase 42(a)) as well as the re-encrypted contents (encrypted using locking key 92(a)), while in another embodiment, locked file 44(a) then only stores the re-encrypted contents (encrypted using locking key 92(a)). Locking key 92(a) is only stored within locking application 90, and locking application 90 is configured to only permit the privileged secure communications application 91 to access the contents via the locking application 90 when the locking application 90 is operated on the correct machine, client 36(a), having certain hardware characteristics that are difficult to replicate.

In some embodiments, within the context of step 170, locking application 90 may also perform various checks to ensure that everything is operating correctly. Thus, in one embodiment, locking application 90 performs an MD5 hash of the public key 72 of the server 32, and checks to make sure that it is the same as the hashed version 74 received within locked file 44(a). In one embodiment, locking application 90 compares the identification code 47(a) received within locked file 44(a) to the local identification code 47'(a) to make sure the locked file 44(a) was sent to the proper client 32. In one embodiment, locking application 90 communicates with server 32 and verifies that certificate 76 is correct. In other embodiments, these various checks may be performed by the secure communications application 91 instead of the locking application 90.

In step 180, the secure communication application 91 retrieves the key 46(a) from locked file 44(a) (which has now been unlocked) via locking application 90 (e.g., by making an API call to locking application 90). In some embodiments, secure communication application 91 only retrieves the key 46(a) from locked file 44(a) as needed to conduct the secure communications 54, and key 46(a) is not stored in unencrypted form on client 32(a) except as needed on a temporary basis for conducting the secure communications 54. Thus, when secured communications 54 with server 32 are not being conducted, any temporarily-stored unencrypted version of key 46(a) is deleted by secure communication application 91, and if subsequent secure communications 54 are to be conducted, secure communication application 91 retrieves the key 46(a) from locked file 44(a) again.

In step 190, secure communication application 91 conducts secure communications 54 between client 36(a) and server 32 using encryption key 46(a), as is well-known in the art.

In one embodiment, method 100 may be performed within the context of a system 230, depicted within FIG. 5. In system 230, several collector devices 236 perform network monitoring of several, respective, local networks 234. Thus, for example, collector application 292(a) running on collector device 236(a) receives network traffic 294(a) traversing local network 234(a), and collector application 292(a) generates a set of events based on the received network traffic 294(a) according to a set of network-monitoring rules, as is well-known in the art. Each collector device 236 is also configured to send the collected event data to aggregator 232 in encrypted format 254. Each collector device 236 is able to properly encrypt the data sent to aggregator 232 by engaging in method 100 in conjunction with aggregator 232. Thus, aggregator 232 functions as a server 32 in the context of method 100, and each collector device 236 functions as a client 36 in the context of method 100. This allows, for example, the encrypted event data 254(a) to be encrypted using key 46(a).

Thus, techniques have been described for securely distributing communication secrets (e.g., keys 46) from a server 32 to a client 36 within an encrypted file 44. Thus, security is preserved, while also being efficient.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of establishing a secure communication channel between a server computer and a client computer, the method comprising:
   at the server computer, receiving a command from a user, the command including a secret passphrase;
   at the server computer, generating a cryptographic key for use by the client computer;
   at the server computer, storing the cryptographic key within a locked file in encrypted form, the locked file being protected by the passphrase;
   at the server computer, sending the locked file to the client computer over a network connection;
   conducting secure communications between the server computer and the client computer over the network connection, using the cryptographic key for encrypting the secure communications;
   at the client computer, receiving the locked file from the server computer across the network connection;
   at the client computer, receiving a client-side command from another user, the client-side command including the secret passphrase;

at the client computer, unlocking the locked file using the secret passphrase, wherein unlocking the locked file includes, by a locking application running on the client computer:
- decrypting contents of the locked file;
- re-encrypting the contents using a locking key securely stored within the locking application;
- discarding the decrypted contents;
- storing the re-encrypted contents in the locked file; and
- granting, to a secure communications application running on the client computer, privileges to access the contents via the locking application to the exclusion of all other applications; and at the client computer, retrieving the cryptographic key from the contents for use by the secure communications application in conducting the secure communications between the server computer and the client computer over the network connection.

2. The method of claim 1 wherein:
the other user is the user;
the server computer is located at a first location; and
the client computer is located at a second location, remote from the first location.

3. The method of claim 2 wherein:
the method further comprises the user traveling from the first location to the second location;
receiving the command from the user at the server computer includes receiving the command from the user via a local user interface of the server computer; and
receiving the client-side command from the other user at the client computer includes receiving the client-side command from the user via a local user interface of the client computer.

4. The method of claim 2 wherein:
receiving the command from the user at the server computer includes receiving the command from the user via a local user interface of the server computer;
the method further comprises the user remotely logging into the client computer from the server computer over a secure channel; and
receiving the client-side command from the other user at the client computer includes receiving the client-side command from the user at the client computer via the secure channel.

5. The method of claim 1 wherein:
the user and the other user are distinct;
the server computer is located at a first location;
the client computer is located at a second location, remote from the first location;
the method further comprises sending the secret passphrase from the server computer to a portable device in the possession of the other user across a communication medium distinct from the network connection.

6. The method of claim 1 wherein:
retrieving the cryptographic key from the unlocked locked file for use by the secure communications application in conducting the secure communications at the client computer includes temporarily storing the retrieved cryptographic key within the secure communications application for only as long as needed to cryptographically process the secure communications, deleting the temporarily stored retrieved cryptographic key upon completion of the secure communications.

7. The method of claim 1 wherein receiving the command from the user at the server computer includes receiving the command via a local interface of the server computer, the command not passing through the client computer.

8. A method of establishing a secure communication channel between a server computer and a client computer, the method comprising:
at the server computer, receiving a command from a user, the command including a secret passphrase;
at the server computer, generating a cryptographic key for use by the client computer;
at the server computer, storing the cryptographic key within a locked file in encrypted form, the locked file being protected by the passphrase;
at the server computer, sending the locked file to the client computer over a network connection; and
conducting secure communications between the server computer and the client computer over the network connection, using the cryptographic key for encrypting the secure communications;

wherein the command is a first command, the secret passphrase is a first secret passphrase, the client computer is a first client computer, the cryptographic key is a first cryptographic key, the locked file is a first locked file, and the method further comprises:
at the server computer, receiving a second command from a user, the second command including a second secret passphrase, the second secret passphrase being distinct from the first secret passphrase;
at the server computer, generating a second cryptographic key for use by a second client computer the second cryptographic key being distinct from the first cryptographic key;
at the server computer, storing the second cryptographic key within a second locked file in encrypted form, the second locked file being protected by the second secret passphrase and the second secret passphrase being distinct from the first secret passphrase;
at the server computer, sending the second locked file to the second client computer over the network connection; and
conducting secure communications between the server computer and the second client computer over the network connection, using the second cryptographic key for encrypting the secure communications between the server computer and the second client computer;

wherein:
the first client computer performs network monitoring of a first local network, thereby generating a first set of events;
the second client computer performs network monitoring of a second local network, thereby generating a second set of events, the second local network being distinct from the first local network;
conducting secure communications between the server computer and the first client computer over the network connection includes securely receiving the first set of events from the first client computer at the server computer;
conducting secure communications between the server computer and the second client computer over the network connection includes securely receiving the second set of events from the second client computer at the server computer; and
the server computer is configured to aggregate the first set of data together with the second set of data for joint processing of the first set of data and the second set of data.

9. The method of claim 8 wherein receiving the command from the user at the server computer includes receiving the first command via a local interface of the server computer, the command not passing through the first client computer.

10. The method of claim 8 wherein the method further comprises:
at the first client computer, receiving the first locked file from the server computer across the network connection;
at the first client computer, receiving a client-side command from another user, the client-side command including the first secret passphrase;
at the first client computer, unlocking the first locked file using the first secret passphrase, wherein unlocking the first locked file includes, by a locking application running on the first client computer:
decrypting contents of the first locked file;
re-encrypting the contents using a locking key securely stored within the locking application;
discarding the decrypted contents;
storing the re-encrypted contents in the locked file; and
granting, to a secure communications application running on the first client computer, privileges to access the contents via the locking application to the exclusion of all other applications; and
at the first client computer, retrieving the first cryptographic key from the contents for use by the secure communications application in conducting the secure communications between the server computer and the first client computer over the network connection.

11. A computer program product comprising a non-transitory computer readable storage medium storing instructions, which, when executed by a computer, cause the computer to perform the following operations:
receiving a command from a user, the command including a secret passphrase;
generating a cryptographic key for use by a client device;
storing the cryptographic key within a locked file in encrypted form, the locked file being protected by the passphrase;
sending the locked file to the client device over a network connection; and
conducting secure communications between the computer and the client device over the network connection, using the cryptographic key for encrypting the secure communications;
wherein:
the command is a first command, the secret passphrase is a first secret passphrase, the client device is a first client device, the cryptographic key is a first cryptographic key, the locked file is a first locked file;
the instructions, when executed by the computer further cause the computer to perform the following operations:
receiving a second command from a user, the second command including a second secret passphrase, the second secret passphrase being distinct from the first secret passphrase;
generating a second cryptographic key for use by a second client device the second cryptographic key being distinct from the first cryptographic key;
storing the second cryptographic key within a second locked file in encrypted form, the second locked file being protected by the second secret passphrase and the second secret passphrase being distinct from the first secret passphrase;
sending the second locked file to the second client device over the network connection; and
conducting secure communications between the computer and the second client device over the network connection, using the second cryptographic key for encrypting the secure communications between the computer and the second client device;
the first client device is configured to perform network monitoring of a first local network, thereby generating a first set of events;
the second client device is configured to perform network monitoring of a second local network, thereby generating a second set of events, the second local network being distinct from the first local network;
the instructions, when executed by the computer, cause the computer to, when conducting secure communications between the computer and the first client device over the network connection, securely receive the first set of events from the first client device at the computer;
the instructions, when executed by the computer, cause the computer to, when conducting secure communications between the computer and the second client device over the network connection, securely receive the second set of events from the second client device at the computer; and
the instructions, when executed by the computer further cause the computer to aggregate the first set of data together with the second set of data for joint processing of the first set of data and the second set of data.

12. A computer program product comprising a non-transitory computer readable storage medium storing instructions, which, when executed by a computer, cause the computer to perform the following operations:
receiving a locked file from a server device across a network connection, the locked file being protected by a secret passphrase;
receiving a client-side command from a user, the client-side command including the secret passphrase;
unlocking the locked file using the secret passphrase, wherein unlocking the locked file includes:
decrypting contents of the locked file;
re-encrypting the contents using a locking key securely stored within the stored instructions;
discarding the decrypted contents;
storing the re-encrypted contents in the locked file; and
granting, to a secure communications application running on the computer, privileges to access the contents to the exclusion of all other applications; and
retrieving a cryptographic key from the contents for use by the secure communications application in conducting secure communications between the server device and the computer over the network connection.

13. The computer program product of claim 12 wherein:
the server device is located at a first location; and
the computer is located at a second location, remote from the first location.

14. The computer program product of claim 13 wherein:
the user travels from the first location to the second location;
the instructions, when executed by the computer, cause the computer to, when receiving the client-side command from the user at the computer, receive the client-side command from the user via a local user interface of the client computer.

15. The computer program product of claim 13 wherein the instructions, when executed by the computer, cause the computer to, when receiving the client-side command from the user at the computer:
operate a remote login session controlled by the user at the server device over a secure channel; and receive the client-side command from the user via the secure channel.

16. The computer program product of claim 12 wherein:

the server computer is located at a first location;

the client computer is located at a second location, remote from the first location;

the instructions, when executed by the computer, cause the computer to, when receiving the client-side command from the user at the computer, receive the client-side command from the user via a local user interface of the computer, the user having received the secret passphrase via a portable device in the possession of the user from the server device over a communication medium distinct from the network connection.

17. The computer program product of claim 12 wherein:

the instructions, when executed by the computer, cause the computer to, when retrieving the cryptographic key from the unlocked locked file for use in conducting the secure communications between the server device and the computer, temporarily store the retrieved cryptographic key within the secure communications application for only as long as needed to cryptographically process the secure communications, deleting the temporarily stored retrieved cryptographic key upon completion of the secure communications.

\* \* \* \* \*